United States Patent
Spearrin et al.

(10) Patent No.: US 12,173,664 B2
(45) Date of Patent: *Dec. 24, 2024

(54) ADAPTIVE ANY-FUEL CAMLESS RECIPROCATING ENGINE

(71) Applicant: THE REGENTS OF THE UNIVERSITY OF CALIFORNIA, Oakland, CA (US)

(72) Inventors: Raymond Mitchell Spearrin, Calabasas, CA (US); Tsu-Chin Tsao, Manhattan Beach, CA (US); Peter Sinsheimer, Santa Monica, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/301,825

(22) Filed: Apr. 17, 2023

(65) Prior Publication Data
US 2023/0383705 A1 Nov. 30, 2023

Related U.S. Application Data

(63) Continuation of application No. 17/548,404, filed on Dec. 10, 2021, now abandoned, which is a
(Continued)

(51) Int. Cl.
*F02D 35/02* (2006.01)
*F01L 9/20* (2021.01)
(Continued)

(52) U.S. Cl.
CPC .............. *F02D 35/022* (2013.01); *F01L 9/20* (2021.01); *F02D 13/0207* (2013.01);
(Continued)

(58) Field of Classification Search
CPC .................................................. F02D 35/022
See application file for complete search history.

(56) References Cited

U.S. PATENT DOCUMENTS 4,661,695 A * 4/1987 Mori ..................... G01M 15/06
73/114.28
4,706,629 A * 11/1987 Wineland .............. F02D 19/087
123/1 A
(Continued)

FOREIGN PATENT DOCUMENTS

CN 111727311 9/2020
DE 19641867 A1 4/1997
(Continued)

OTHER PUBLICATIONS

European Patent Office (EPO), "The extended European search report" issued Sep. 6, 2021, related European patent application No. 19747447.1, pp. 1-7, claims searched, pp. 8-11.
(Continued)

*Primary Examiner* — Kevin R Steckbauer
(74) *Attorney, Agent, or Firm* — O'BANION & RITCHEY LLP; John P. O'Banion

(57) ABSTRACT

An adaptive, any-fuel reciprocating engine using sensor feedback integration of high-speed optical sensors with real-time control loops to adaptively manage the electronic actuation schemes over a range of engine loads and fuels. The engine uses one or more optical sensors to collect specific types of gas property data via a spectroscopic technique to adaptively control various components within the engine.

27 Claims, 4 Drawing Sheets

Related U.S. Application Data continuation of application No. 16/929,544, filed on Jul. 15, 2020, now Pat. No. 11,225,917, which is a continuation of application No. PCT/US2019/016416, filed on Feb. 1, 2019.

(60) Provisional application No. 62/625,986, filed on Feb. 3, 2018.

(51) Int. Cl.
   *F02D 13/02*     (2006.01)
   *F02D 15/00*     (2006.01)
   *F02D 41/14*     (2006.01)
   *F02P 5/145*     (2006.01)

(52) U.S. Cl.
   CPC ......... *F02D 13/0253* (2013.01); *F02D 15/00* (2013.01); *F02D 35/025* (2013.01); *F02D 41/1402* (2013.01); *F02P 5/145* (2013.01); *F02D 2200/021* (2013.01); *F02D 2200/0611* (2013.01)

(56) References Cited

U.S. PATENT DOCUMENTS

| | | | | |
|---|---|---|---|---|
| 5,029,565 A * | 7/1991 | Talbot | | F02P 5/152 73/35.07 |
| 5,659,133 A * | 8/1997 | Sims | | G01M 15/10 73/35.14 |
| 5,983,866 A * | 11/1999 | Ginzel | | F02D 41/222 123/481 |
| 6,439,211 B1 | 8/2002 | Juretzka | | F02D 21/08 123/90.15 |
| 6,947,830 B1 * | 9/2005 | Froloff | | F02D 41/3076 701/111 |
| 8,265,851 B2 * | 9/2012 | Girouard | | F01D 17/04 73/23.31 |
| 8,301,359 B1 * | 10/2012 | Sagar | | G05B 19/042 123/1 A |
| 9,243,603 B2 * | 1/2016 | Martin | | G01M 15/06 |
| 10,947,920 B2 * | 3/2021 | Martin | | G01N 15/06 |
| 11,225,917 B2 * | 1/2022 | Spearrin | | F02D 13/0253 |
| 2001/0006049 A1 * | 7/2001 | Buehrle, II | | F01L 9/10 123/90.15 |
| 2010/0292906 A1 * | 11/2010 | Girouard | | F01D 17/06 701/100 |
| 2013/0239579 A1 * | 9/2013 | Girouard | | F01D 17/08 60/773 |
| 2014/0034833 A1 * | 2/2014 | Parks, II | | G01N 21/3504 250/341.2 |
| 2014/0149018 A1 * | 5/2014 | Martin | | F02D 41/062 701/102 |
| 2015/0073681 A1 * | 3/2015 | McAlister | | F02D 19/0634 701/110 |
| 2015/0176513 A1 * | 6/2015 | Lana | | F02D 41/1439 123/698 |
| 2015/0198136 A1 * | 7/2015 | Martin | | G01S 17/06 356/72 |
| 2017/0268445 A1 * | 9/2017 | Klinder | | F02D 41/0007 |
| 2019/0093584 A1 * | 3/2019 | Martin | | G01N 15/06 |
| 2021/0003087 A1 * | 1/2021 | Spearrin | | F02B 77/085 |
| 2022/0170423 A1 * | 6/2022 | Spearrin | | F02D 13/0253 |
| 2023/0383705 A1 * | 11/2023 | Spearrin | | F02D 15/02 |

FOREIGN PATENT DOCUMENTS

| | | | | |
|---|---|---|---|---|
| DE | 102006000097 A1 | | 9/2006 | |
| DE | 102014119656 A1 * | | 7/2015 | ......... F02D 35/022 |
| GB | 2409913 A | | 7/2005 | |
| JP | H0348742 | | 3/1991 | |
| JP | 2004068754 | | 3/2004 | |
| JP | 200576484 | | 3/2005 | |
| JP | 2005195025 | | 7/2005 | |
| JP | 2005256709 | | 9/2005 | |
| JP | 2009203874 | | 9/2009 | |
| JP | 2009203874 A * | | 9/2009 | |
| JP | 201014038 | | 1/2010 | |
| JP | 2013510264 | | 3/2013 | |
| JP | 2016504552 | | 2/2016 | |
| JP | 5983866 B2 * | | 9/2016 | ......... F02D 35/023 |
| KR | 102446477 B1 | | 9/2022 | |
| WO | 2009093746 A1 | | 7/2009 | |
| WO | 2011056193 A2 | | 5/2011 | |
| WO | 2015046875 A1 | | 4/2015 | |
| WO | 2019152886 | | 8/2019 | |
| WO | WO-2019152886 A2 * | | 8/2019 | ............... F01L 9/20 |

OTHER PUBLICATIONS

ISA/US, United States Patent and Trademark Office (USPTO), International Search Report and Written Opinion issued Apr. 22, 2019, related PCT international application No. PCT/US2019/016416, pp. 1-13, claims searched, pp. 14-20.

Korean Intellectual Property Office (KIPO), Notice of Preliminary Rejection issued on Feb. 11, 2022, related Korean application No. 10-2020-7021847, Korean language document pp. 1-3, English-language translation, pp. 4, claims examined, pp. 5-10.

State Intellectual Property Office of the People's Republic of China, Office Action issued Feb. 18, 2022, related Chinese patent application No. 2019800113833, Chinese-language document, pp. 1-13, English-language translation, pp. 13-14, claims examined, pp. 15-22.

Intellectual Property India, Examination Report issued May 12, 2022, related Indian application No. 202017032341, Indian language and translation document pp. 1-8, claims searched 9-15.

Japan Patent Office (JPO), official action issued Nov. 15, 2022, related Japanese patent application No. 2020-541952, Japanese-language document, pp. 1-6, English-language translation, pp. 7-11, claims examined, pp. 12-19.

Japan Patent Office (JPO), official action issued Feb. 27, 2024, related Japanese patent application No. 2020-541952, Japanese-language document, pp. 1-5, English-language translation, pp. 6-9, claims examined, pp. 10-20.

European Patent Office (EPO), Communication pursuant to Article 94(3) issued Apr. 2, 2024, related European patent application No. 19747447.1, pp. 1-4, claims searched, pp. 5-9.

\* cited by examiner

ADAPTIVE ANY-FUEL CAMLESS RECIPROCATING ENGINE

CROSS-REFERENCE TO RELATED APPLICATIONS

This application claims priority to, and is a continuation of, U.S. patent application Ser. No. 17/548,404 filed on Dec. 10, 2021, incorporated herein by reference in its entirety, which claims priority to, and is a continuation of, U.S. patent application Ser. No. 16/929,544 filed on Jul. 15, 2020, now U.S. Pat. No. 11,225,917 issued on Jan. 18, 2022, incorporated herein by reference in its entirety, which claims priority to, and is a 35 U.S.C. § 111(a) continuation of, PCT international application number PCT/US2019/016416 filed on Feb. 1, 2019, incorporated herein by reference in its entirety, which claims priority to, and the benefit of, U.S. provisional patent application Ser. No. 62/625,986 filed on Feb. 3, 2018, incorporated herein by reference in its entirety. Priority is claimed to each of the foregoing applications.

The above-referenced PCT international application was published as PCT International Publication No. WO 2019/152886 on Aug. 8, 2019, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to reciprocating engines, and more particularly to an adaptive, any-fuel engine using sensor feedback.

2. Background Discussion

Conventional reciprocating engines generally use fixed parameters for engine functions such as timing, duration and phase of various engine components. These fixed parameters result in a compromise of optimal intake and exhaust timing between high and low engine loads.

A feature of a camless engine is the removal of the mechanical camshaft, thereby enabling variable valve timing (VVT) by electromagnetic or hydraulic actuation of the poppet valves which control intake and exhaust. Since a camshaft typically has only one lobe per valve, conventional valve actuation involves fixed duration, lift, and overall profile cycle-to-cycle. The electric valves of the conventional camless engine runs with and has little to no ability to adapt to a new fuel. While they can be adjusted, they are generally incapable of being adaptive without real-time feedback.

BRIEF SUMMARY

An aspect of the present description is an adaptive, any-fuel reciprocating engine using sensor feedback integration of high-speed optical sensors with real-time control loops to adaptively manage the electronic actuation schemes over a range of engine loads and fuels.

In one embodiment, one or more lasers is utilized to collect specific types of gas property data (e.g., temperature during combustion, species concentration, etc.) via a spectroscopic technique (e.g., absorption) in microseconds to milliseconds, and the information is sent to an adaptive controller in microseconds to milliseconds. The adaptive controller uses this information to control (e.g., modify) timing, phase, and duration of operation for specific electronically controlled mechanical devices (e.g., intake valve, exhaust valve, spark plug, fuel injector, gear box for piston compression, etc.) in microseconds to milliseconds. The adaptive controller also uses the information to control (e.g., modify) the temporal characteristics of these devices (e.g., timing, duration, sequencing, depth) in microseconds to milliseconds. The laser spectroscopy sensor can than read the impact of this modification and provide rapid feedback to the adaptive controller to continuously adapt to engine output, fuel input, emissions, and engine load changes.

In another embodiment, the closed control-feedback loop using high-speed optical sensors is implemented in a camless engine that is "adaptive" to "any fuel" as described herein.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
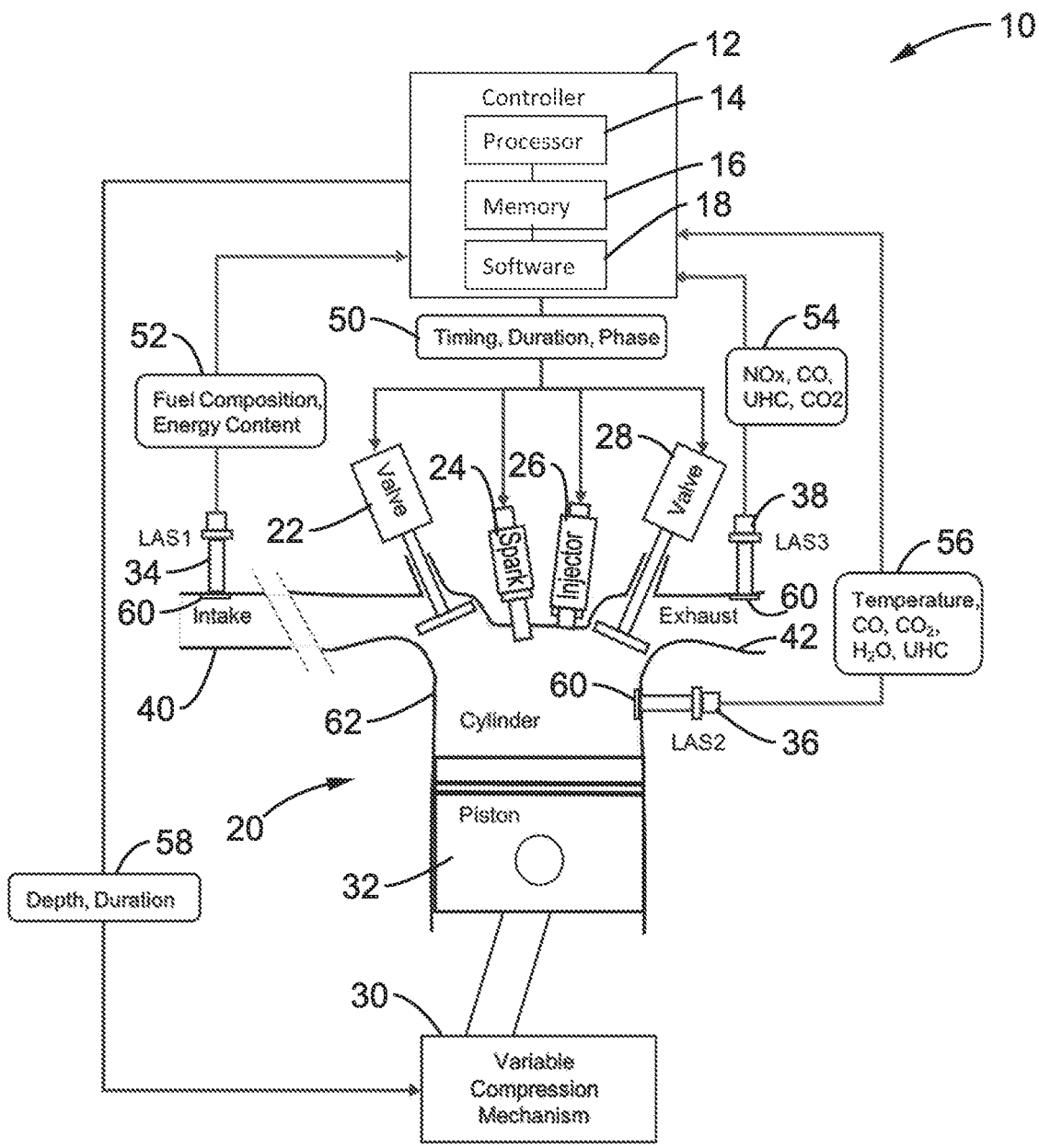
FIG. 1 shows a schematic diagram of a single-cylinder cross-section of a camless engine with sensors and key control loops identified according to an embodiment of the present technology.

FIG. 1 details one embodiment of the present description comprising an adaptive, any-fuel camless reciprocating engine 10. Engine 10 generally comprises a cylinder 62 that houses a reciprocating piston 32 and incorporates electronically-controllable actuators in the form of one or more valves 22/28, spark ignition apparatus 24 (e.g. spark plugs), and fuel injection apparatus 26 that manage one or more functions comprising intake/exhaust valve timing, compression ratio, spark ignition, and fuel injection. One or more sensors are provided, (e.g. optical sensors such as laser absorption spectroscopy (LAS) sensors 34, 36, and 38) in various engine locations, e.g. in-cylinder 62 (LAS2), upstream at intake 40 (LAS1), and/or down-stream at exhaust 42 (LAS3) of the cylinder 62 to measure fluid/fuel properties (e.g., temperature, species). A digital or analog control loop is provided via controller 12 that utilizes the sensor input data (e.g. fuel composition and energy content data 52 received from intake 40 and LAS1, $NO_x$, CO, UHC, $CO_2$ data 54 from exhaust 42 and LAS3, or temperature, CO, $H_2O$, UHC, $CO_2$ data 56 from cylinder 62 and LAS2) to actively manage rapid actuation of (e.g., intake, exhaust, spark plug, fuel injector). This combination of features allows the engine 10 to be optimized in real-time for a range of engine loads and fuels or fuel blends.

In the embodiment illustrated in FIG. 1, one or more lasers (LAS1, LAS2, or LAS3) are preferably utilized to collect specific types of gas property data (e.g., temperature during combustion, species concentration, etc.) via a spectroscopic technique (e.g. absorption) and send the information to the adaptive controller 12. This information is used to modify and deliver one or more functions 50 such as timing, phase, and duration of operation for specific electronically controlled mechanical devices (e.g., intake valve 22, exhaust valve 28, spark plug 24, and fuel injector 26). Additionally, various control parameters 58 may be used to control the gear box for piston compression (e.g. via variable compression mechanism 30). Control parameters may comprise one or more temporal characteristics of these devices (e.g., timing, duration, sequencing, or depth).

Finally, the laser spectroscopy sensors LAS1, LAS2 and LAS3 may subsequently then read the impact of this modification and provide rapid feedback to the controller 12 to continuously adapt to engine output, fuel input, emissions, and engine load changes. The entire process can be done in microseconds to milliseconds.

Figure 3:
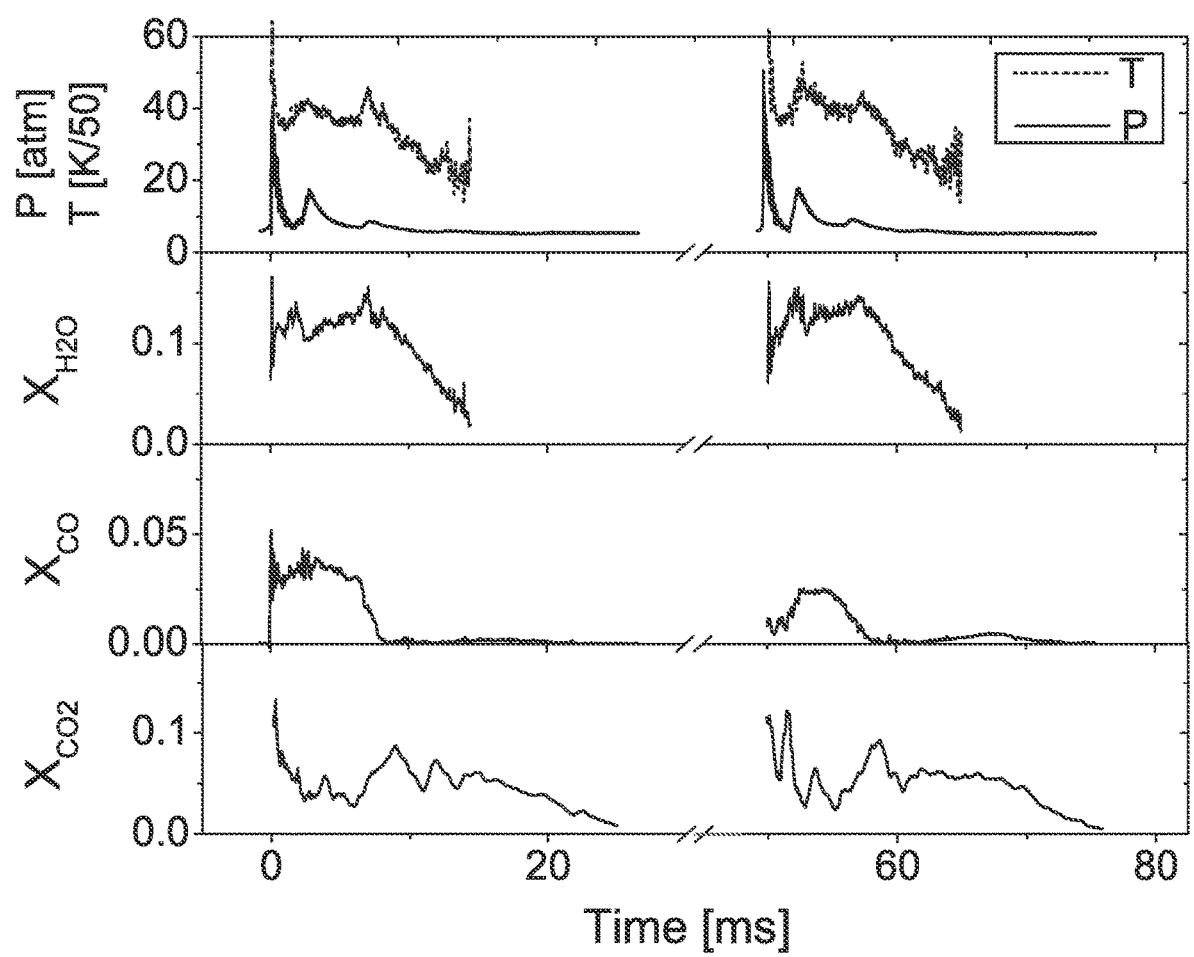
FIG. 3 is a plot showing time-resolved (~10 kHz) laser absorption measurements of temperature, CO, $CO_2$, and $H_2O$ during pulsed detonations.

Laser spectroscopy sensors LAS1, LAS2 and LAS3 are particularly implemented for performing measurements in harsh combustion environments and resolving the time-scales of chemistry (milliseconds to microseconds) and other flow-field dynamics (see FIG. 3). These LAS optical measurements are made in situ through small windows 60 disposed in the walls of the engine (preferably mounted flush with the inside wall of the sensor location) so as to be non-intrusive to the combustion mechanics of the engine 10.

In a preferred embodiment, LAS1, LAS2 and LAS3 comprise semi-conductor lasers 10 in the mid-infrared wavelength region to provide reduced cost and size to thereby enable deployable modalities. It is appreciated that the particular locations shown in FIG. 1 for sensors LAS1, LAS2 and LAS3 or for illustrative purposes only, and that any number of locations, sensors, and sensor types may be employed. The three general or preferred target engine locations for these optical sensors are positioned as follows to provide information for control and actuation: 1) upstream for fuel composition; 2) in-cylinder for temperature and major species; and 3) downstream for exhaust for trace emissions sensing. Fuel composition measured upstream (e.g. with LAS1) may be used to optimize fuel-air ratios prior to combustion to prevent excessively rich or lean conditions. In-cylinder (e.g. with LAS2) temperature and species measurements can be used to optimize compression ratios and exhaust gas recirculation for preventing NOx formation. Exhaust stream measurements (e.g. with LAS3) may be used to identify major emitters such as carbon monoxide, unburned hydrocarbons, and NOx can be leveraged to fine tune other valve timing on the fly.

Controller 12 preferably comprises application software 18 that is stored in memory 16 and executable on processor 14 for operation and acquisition of the input data 52, 54 and 56 from the sensors, processing/analyzing the data, and then generating one or more commands 58.

While the embodiment illustrated in FIG. 1 is directed to a camless engine configuration, it is appreciated that the one or more LAS sensors may also be implemented at various locations within a cam-shaft engine to provide feedback and control of one or more actuators (e.g. spark ignition, fuel injection variable compression, etc.).

Figure 2:
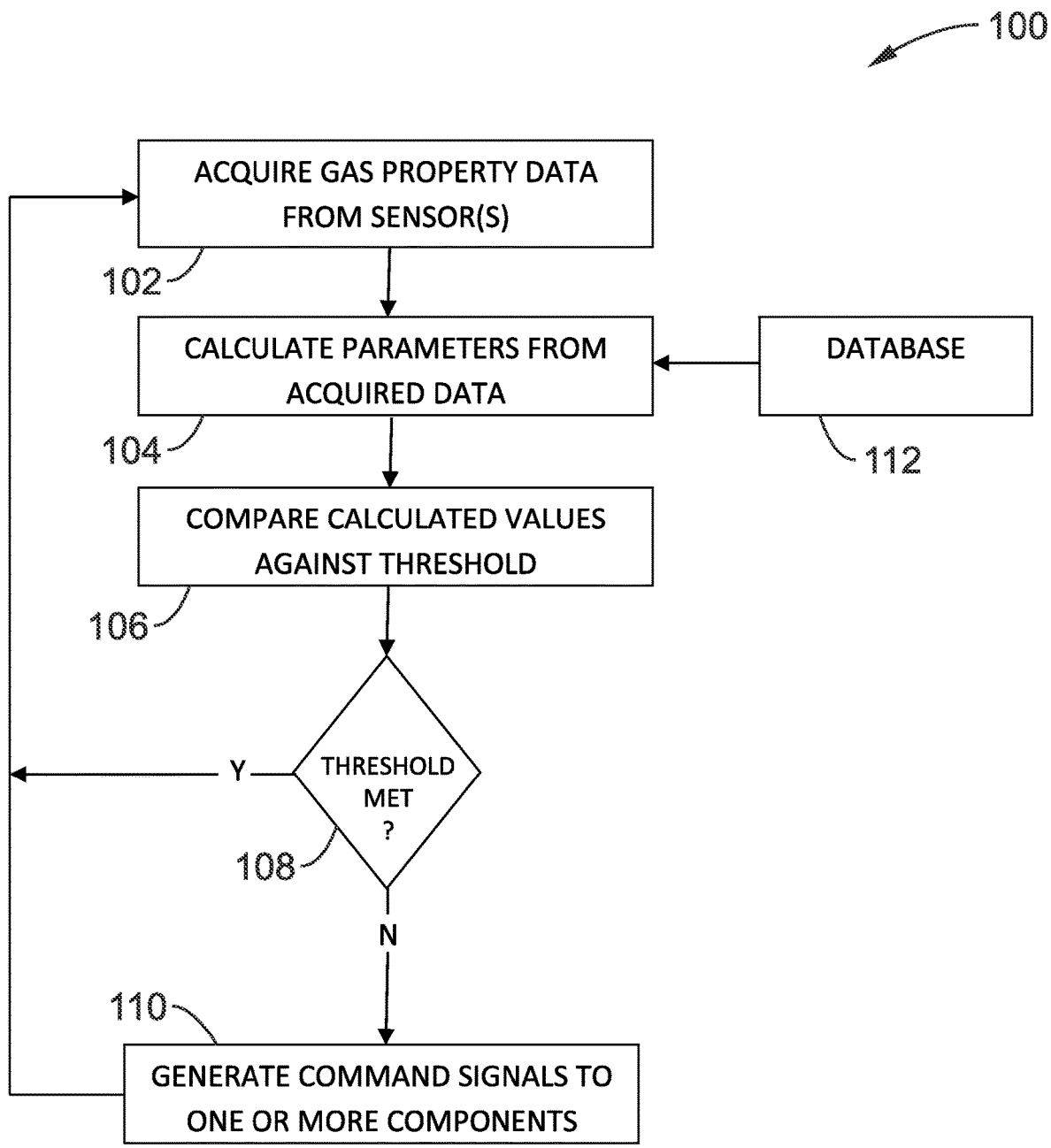
FIG. 2 is a schematic flow diagram of a control process for operating the engine of FIG. 1.

FIG. 2 shows a schematic flow diagram of a control method 100 for acquiring and analyzing sensor data for control of one or more of the engine components. Control method 100 may be implemented as instructions or code within one or more modules in application programming or software 18. At step 102, data is acquired from the one or more sensors (e.g. LAS1, LAS2, and LAS3 in the form of absorption spectra). At step 104, the acquired data is analyzed to calculate one or more parameters with respect to gas properties at the sensor locations, e.g. temperature, pressure, fuel composition, energy content, etc. These calculations may be used to identify species within the sensing location with use of stored values in database 112 and one or more spectroscopy techniques such as wavelength modulation spectroscopy or infrared molecular spectroscopy, as detailed below. At step 106, the calculated values are compared against a target or threshold value regarding one or more parameters at the sensor locations. If the threshold or target is not met at step 108, the controller generates one or more command signals at step 110 to one or more components of the engine. For example, commands relating to timing, duration, phase, etc. may be sent to valves 22/28, injector 26, or spark plug 24. Commands (e.g. depth duration 58) may also be sent to the variable compression mechanism 30. Subsequent to the command step 100, or if threshold is met at step 108, the routine returns back to sensing/acquisition step 102 for verification if whether the one or more parameters have met or shifted toward the threshold or target.

By employing the above-described methodology, traditional mechanical controls of a reciprocating engine may be removed or significantly altered. Repetitive functions such as injection/intake, compression, and ignition become free parameters that can be optimized actively for a diverse set of chemical fuels including non-renewable fuels (e.g., natural gas, diesel, gasoline) and renewable-based fuels (e.g., biofuels, renewable-based ammonia, renewable-base methane). By employing real-time feedback as provided in method 100, significant limitations may be overcome, particularly with reliable electronic control and fuel-flexibility in camless engines. With the integration of optical sensing methods, one or more digital control algorithms (detailed below) may be implemented to run at maximum efficiency over a wide range of loads while minimizing pollutant formation based on rapid feedback and real-time adjustment.

It is appreciated that the technology illustrated in FIG. 1 departs significantly from traditional reciprocating engines characterized by inflexible cycle timing locked by the physical geometry of the camshaft, which leads to compromises in performance and emissions over the range of operating conditions/loads, and where there is a limited ability to control spark plug timing and duration and fuel injector timing and duration. The rigidity of mechanical controls and cycle timing in traditional engines also limit the degree to which an engine may accommodate different fuels or fuel blends that involve different chemical reaction rates, energy densities, and ignition thresholds. In contrast, the adaptive digital engine control technology described in FIG. 1 and FIG. 2 above directly addresses and removes these limitations, and thus provides a new medium by which the renewable power transition may progress through a stable distributed generation framework. With this unique engine framework, one or more of the following operational parameters may be optimized in a real-time manner: variable valve timing, variable compression ratio, adaptive ignition, etc.

For a camless architecture with electronic valve actuation, valve duration, lift, and phasing to become free parameters, which can then be optimized across all engine loads with rapid in-situ sensor feedback. Several types of variable valve timing schemes are known to benefit engine performance. These include early or late closing of the intake valve 22 and exhaust valve 28 as a function of engine speed to reduce pumping losses, better control in-cylinder temperatures (i.e., prevent NOx formation), and variable compression ratio (VCR).

Variable compression ratio (VCR) improves fuel economy/engine efficiency by allowing the compression ratio to increase during low engine loads (see FIG. 3), where knock is less of a concern. VCR may be achieved through valve timing and variable gearing or removal of the crankshaft (e.g., free-piston engine). Finally, adaptive ignition (AI) strategies permit the adaptive use of spark ignition and/or direct injection-based ignition (e.g., diesel) to stabilize the transition to new fuels. These actuation strategies can readily be optimized with real-time sensing.

For reciprocating engines, cycle times of 6000 rpm (100 Hz) generally involve measurements of at least a few kHz to resolve fluid property transients within the cylinder. In the context of the aforementioned actuation strategies, time-resolved, in-cylinder temperature and species data is invaluable to rapid optimization, helping balance the competing needs for efficiency and emissions mitigation. However, due to the speed requirement and harsh thermodynamic environment, conventional sensors fail to provide such in-cylinder information. Any optimization would therefore involve a trial and error basis during engine characterization/development. Allowing for variability in fuel composition further complicates the challenge of optimization, because such variability introduces an expansive set of free parameters that include ignition delay times and reaction rate constants that determine combustion kinetics.

Figure 4:
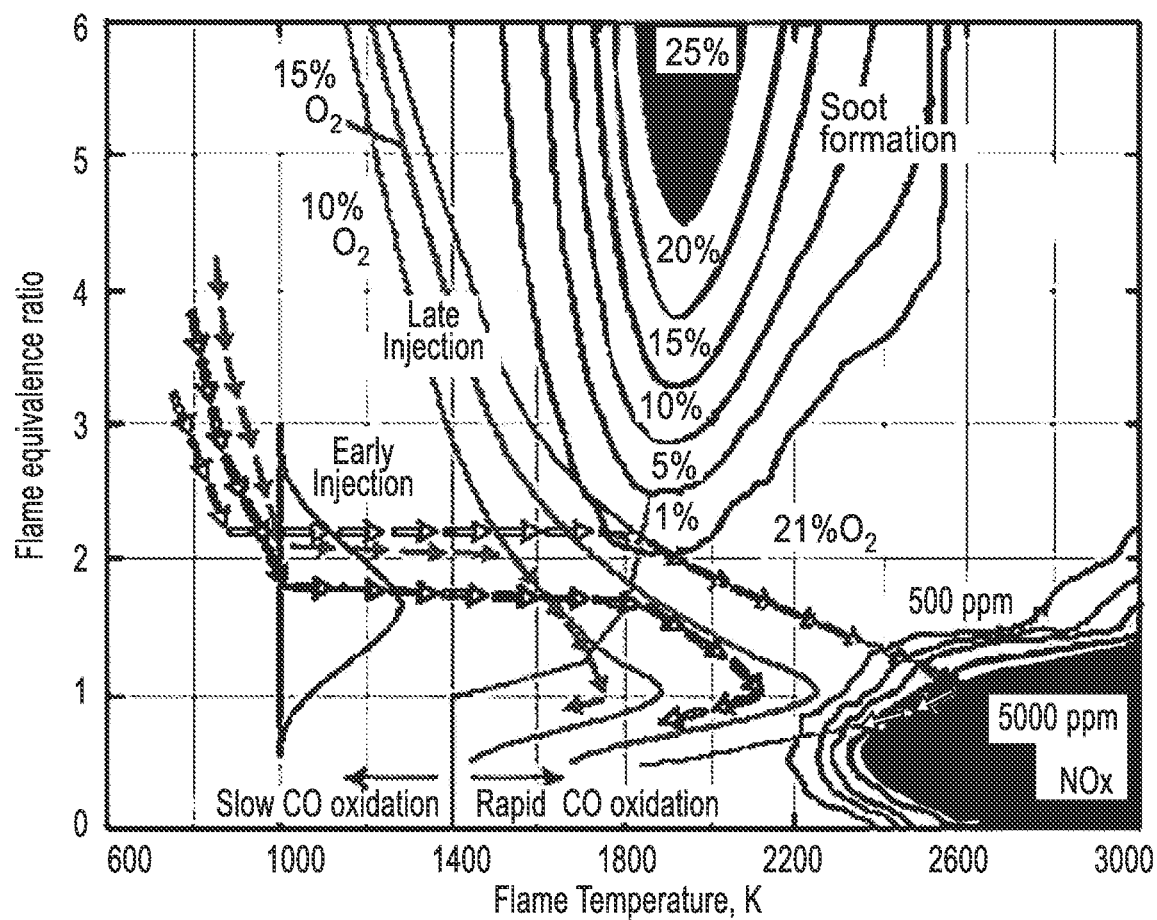
FIG. 4 is a plot of regimes of soot and NOx formation expressed in terms of fuel/air equivalence ratio and flame temperature, overlaid with common combustion strategies indicated by lines representing the path or domain of the injection/compression cycle.

One exemplary use case for the adaptive, any-fuel engine architecture of the present disclosure is the delicate balance of efficiency and NOx emissions. FIG. 4 shows a plot of the formation of the nitrogen oxide air pollutants (as well as soot). Recognizing that temperature is positively correlated with efficiency, this plot shows that it is desirable to compress to the extent that peak combustion temperatures are high, but not so high as to exceed the temperature where NOx formation becomes significant (~2200 K). Engine manufacturers typically spend considerable effort in the initial development phase to set fixed parameters that allow some margin on the temperature during operation in order to strike a good balance (or optimization) of these competing demands (high efficiency vs. low emissions). Unfortunately, the extent of compression required for a given fuel or fuel blend to produce a fixed peak temperature is not constant, even while the temperature at which substantial NOx formation is fairly constant.

Correspondingly, a measurement of the in-cylinder temperature (e.g. via LAS2) acquired at the controller 12 (e.g. at step 102, FIG. 2) may be used as feedback in structuring command signal 110 (FIG. 2) to adjust one or more of compression ratio or valve timing to suppress peak temperature (i.e. exhaust gas recirculation). This allows for adaptability to different fuels and tighter temperature margins to achieve maximum efficiency (i.e. fuel economy).

FIG. 4 also highlights a number of other common combustion strategies indicated by lines representing the path or domain of the injection/compression cycle. The adaptive any-fuel engine 10 utilizing the real-time closed control loop method 100 accordingly measures one or more fundamental parameters such as temperature to provide a means to successfully accomplish these strategies (e.g. comparison/threshold step 106 in FIG. 2), and to change or modify strategies, depending on the fuel, local emissions regulation, and the power demand.

The laser-based sensors (LAS1, LAS2, and LAS3) used to provide measurements of temperature (and species) have been demonstrated in harsh, transient combustion environments as shown in FIG. 4.

The laser-based diagnostic systems and methods detailed preferably incorporate absorption spectroscopy (e.g. at step 104 (FIG. 2), whereby the wavelength dependence of the absorption of electromagnetic radiation by matter is employed to infer the presence and quantity of specific target species at a given gas condition. This wavelength dependence is the result of the quantized and unique internal energy states of individual molecular species. Each molecular species has a distinct absorption spectrum that may be utilized as a unique fingerprint to identify and distinguish individual molecular species.

The absorption spectrum of a molecule is described by the Beer-Lambert-Bouguer law, which states that the strength of the absorption signal is proportional to the path length over which the electromagnetic radiation and molecules interact. Beer's Law can be expressed as:

$$\alpha_v = -\ln\left(\frac{I_t}{I_0}\right) = S_j(T)\phi_v P x_{abs} L$$

where measured quantities of incident and transmitted light intensities ($I_0$ and $I_t$) define the spectral absorbance, $\alpha_v$, at wavelength v, which is further related to the product of spectroscopic line parameters ($S_j$, $\phi_v$), gas pressure (P), the optical path-length (L), and the concentration of the absorbing species ($x_{abs}$). The non-linear and variable wavelength dependence of temperature further allows for the determination of temperature by measurement of two or more wavelengths.

Infrared Molecular Spectroscopy

In a preferred embodiment, infrared molecular spectroscopy is employed for calculating and comparison/thresholding steps 104/106 in control method 100 of FIG. 2. As discussed above, every molecular species has a distinct absorption spectrum resulting from the quantized and unique internal energy states of the molecule. An absorption spectrum is composed of individual absorption lines corresponding to transitions between discrete energy states. Absorption in the infrared region of the spectrum corresponds to rovibrational energy transitions. These quantized energy states emerge from the atomic constituents and their geometrical arrangement within the molecule. Thus, by the exact reason molecules themselves can be distinguished (atomic constituents and geometry) so can their respective absorption spectra. Similarities in molecular structure of two distinct molecular species may lead to regions of the absorption spectra with overlapping absorption lines. This possibility for interference from overlapping lines necessitates judicious selection of absorption lines for diagnostic utility.

Absorption spectra from hundreds of molecular species have been catalogued in several standardized databases including: HITRAN, HITEMP, PNNL Northwest-Infrared, and NIST Quantitative Infrared Database. These databases are employed to simulate the absorption spectra of the species of interest and a comprehensive set of potential interfering species. The resulting combined spectrum is programmatically searched for strong, well-isolated absorption lines of the target molecular species that are accessible with laser sensors. The selected line and expected interferences are then experimentally verified in laboratory tests using synthetic gas mixtures at controlled temperature, pressure, and mole fraction. In these controlled conditions, line shape parameters (i.e., line position, line strength, and spectral broadening) are characterized and compared to catalogued values. Accordingly, characteristics of the hardware configuration for the absorption spectroscopy sensors LAS1, LAS2, and LAS3 are a function of the characteristics of the selected line.

Wavelength Modulation Spectroscopy

Wavelength-modulation spectroscopy (WMS) is another laser absorption technique which may be employed for calculating one or more parameters (at step 104, FIG. 2) from the data acquired by one or more of sensors LAS1, LAS2, and LAS3. WMS adapts the analog signal processing concepts of a modulated carrier wave and lock-in amplification to further improve upon the sensitivity and noise characteristics of absorption spectroscopy. WMS is based on the premise that the predominant absorption spectroscopy noise sources tend to occur at low frequencies and that through shifting the baseband absorption spectroscopy signal to higher passband frequencies many of these noise sources can be avoided. This is achieved by modulating the wavelength and intensity of the laser (LAS1, LAS2, and LAS3) output. The modulation of the laser signal shifts the information content of the absorption signal to harmonics of the modulation frequency. A lock-in amplifier (not shown) may then be employed to create a passband filter about the specific harmonics of interest to extract the desired signals. Using a narrow-passband lock-in amplifier can substantially suppress broadband noise and, by appropriately selecting modulation frequencies, dominant noise bands can be avoided altogether.

These noise rejection characteristics further reduce the detection limits possible with an absorption spectroscopy sensor. An additional benefit afforded by signal modulation is the opportunity to simultaneously co-propagate the emission of multiple lasers by employing frequency-division multiplexing. This technique permits multiple distinct molecular species to be detected simultaneously within a single gas sample.

It will further be appreciated that the adaptive any-fuel reciprocating engine 10 as detailed above has widespread use opportunities. For example, some governmental bodies have set aggressive renewable energy goals for the power sector. This has led to a growth in intermittent supply associated with solar and wind power generation. Concurrently, goals to optimize the power grid have trended towards distributed generation to more efficiently and reliably meet localized demand, eliminate transmission costs, and enhance security. The combination of these changes in the power sector have led to a significant challenge to compensate for intermittent supply at the local level. Intermittency at the level of centralized power generation (as opposed to distributed generation) has increasingly been addressed by variable-load gas turbines, or peaker turbines. However, high emissions associated with running gas turbines at low loads and general difficulties with scaling down gas turbines and ancillary technologies, from a cost vantage, make the technology less appealing in the context of localized distributed generation, wherein flexibility (size, fuel), low-cost at small scale, and rapid load-ramping are important.

A reliable solution, which has been deployed for many years to provide local backup power when the grid falters, is the reciprocating engine. Reciprocating engines for backup power have historically been diesel cycles associated with undesirable emissions profiles and little fuel flexibility.

The adaptive any-fuel camless reciprocating engine as described herein presents a new approach to using reciprocating engines for power generation that leverages its inherent strengths for managing grid stability at the local level, and provides a path towards meeting ambitious renewable energy goals. Commercial advantages and potential applications/customers for power generation are detailed further below.

1. The adaptive, any-fuel reciprocating engine can allow for an increase in thermal efficiency at low engine loads, reducing fuel consumption and thus lowering net cost of power generation
2. The use of instant laser informatic digital output and adaptive control increases engine reliability and allows for more efficient and effective preventive system maintenance
3. The adaptive, any-fuel reciprocating engine allows for constant, rapid monitoring of engine emissions, which provides for new mitigation strategies and the ability to establish new regulatory emissions thresholds by capturing emissions dynamics over all load conditions.
4. The use of continuous laser informatic digital output reduces regulatory burden with respect to enforcing emissions regulations.
5. The adaptive, any-fuel reciprocating engine allows the same engine to use multiple gas fuels and/or multiple liquid fuels for the full range of power generation functionality including base-load power, back-up power, and/or peaking power
6. The adaptive, any-fuel reciprocating engine can be attached to one or more gas fuel sources and one or more liquid fuel sources at the same time allowing the engine system to rapidly switch between power generation functions—e.g. base-load, standby/backup, and peaking.
7. The adaptive, any-fuel reciprocating engine can be tailored for the following target markets:

(a) Backup Generator
  (i) Currently, existing backup gensets that are attached to the electrical system of a facility primarily use compression-injection ignition engines (i.e. diesel). These standby/backup generators are typically used is when there is a loss of electricity from the utility grid.
  (ii) The adaptive, any-fuel reciprocating engine can allow any facility with an installed backup generation system to retrofit and/or swap out their existing compression engine for with the any-fuel reciprocating engine of the present description and allow the new engine to generate base load power to the facility and peaking power to the utility grid while still function to provide backup/standby power to the facility.
  (iii) Expanding the functionality of the existing genset to baseload and peaking power has the potential to reduce the cost of baseload power to the facility—in cases where the cost of self-generating power using the genset is less than the cost of power purchased from the grid as well as generate revenue for the facility by selling electricity to the utilities during peak period when the utility is in need additional supply of electricity of their grid to fulfill demand.
  (iv) The market for backup power generation is large, global, and diverse. It includes the following sectors: commercial, industrial, and retail businesses, hospitals, mining and energy extraction activities, datacenters.
(b) Baseload Generation Market
  The adaptive, any-fuel reciprocating engine is particularly suitable to the industrial, commercial, and institutional sectors where self-generation can reduction the cost of power compared to the cost of power purchased from the grid and/or reduces the uncertainty in the cost of power associated with time-of-day electricity grid pricing.
(c) Utilities
  Successful diffusion of gensets employing the adaptive, any-fuel reciprocating engine of the present description have the potential to create a regional distributed generation infrastructure, which could provide a number of benefits to utilities including: reducing stress on the grid thereby increasing the utility grid lifespan, providing localized electricity from a DG location to the local grid with a high demand thereby increasing the efficiency of electricity generation by reducing transmission line loss, incentivizing the use of renewable bas or liquid fuels allowing the utility to fulfill renewable energy portfolio requirements
(d) Mobile Engine Market
  Successful diffusion in the genset market, the adaptive, any-fuel camless reciprocating engine could readily be transferred to the mobile engine market for both transportation applications (including cars, trucks, buses, ships, helicopters, planes, etc.) and off-road vehicles (including tractors, bulldozers, cranes, etc.).
(e) Policy Makers
  (i) The any-fuel reciprocating engine has the capability for reducing the cost of electricity to industrial, commercial, and institutional users thereby reduction the chance that such users will move their facility to a location where the cost of electricity is less.
  (ii) The any-fuel reciprocating engine has the capability for increasing the likelihood of fulfilling renewable energy mandates by using renewable fuel in the any-fuel reciprocating engine gensets and/or stabilizing a region's electricity grid allowing a larger share to total electricity supply from intermittent power sources such as wind, solar, hydro, geothermal, and tidal.
  (iii) The any-fuel camless reciprocating engine has the capability to reduce emissions for stationary power and mobile applications.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

An adaptive camless reciprocating engine, the engine comprising: a cylinder housing a reciprocating piston; a valve coupled to the cylinder; at least one electronically-controllable actuator coupled to the valve, the actuator configured to control operation of the valve; one or more optical sensors disposed at or near the cylinder and configured to acquire optical data within the cylinder or at a location upstream or downstream from the cylinder; and a controller coupled to the one or more optical sensors and electronically-controllable actuator in a closed control loop; wherein the controller is configured to receive data from the one or more optical sensors and process said data to actively manage actuation of the electronically-controllable actuator according to one or more parameters calculated from the acquired optical data.

The engine of any preceding or following embodiment, further comprising: a plurality of electronically-controllable actuators coupled to the controller and one or more corresponding engine components; wherein the engine components are selected from the group consisting of: an intake valve, exhaust valve, spark plug, fuel injector, and variable compression mechanism; and wherein the controller is configured to manage one or more parameters selected from the group consisting of cylinder intake/exhaust valve timing, compression ratio, spark ignition, and fuel injection.

The engine of any preceding or following embodiment, wherein the one or more optical sensors are disposed at locations for measurement of a fluid property within a cavity comprising one or more of the cylinder, an intake to the cylinder, or an exhaust of the cylinder.

The engine of any preceding or following embodiment, wherein said fluid property comprises one or more of temperature or species identification within the cavity.

The engine of any preceding or following embodiment, wherein said fluid property comprises one or more of fuel consumption, fuel energy content, exhaust gas components, cylinder combustion temperature, or cylinder combustion components within the cavity.

The engine of any preceding or following embodiment, wherein the controller is configured to manage one or more of timing, duration or phase parameters for actuation of the one or more components.

The engine of any preceding or following embodiment, wherein said optical sensors comprise laser absorption spectroscopy sensors.

The engine of any preceding or following embodiment, wherein said controller is further configured to manage parameters selected from the group consisting of engine output, fuel input, emissions, and engine load changes.

The engine of any preceding or following embodiment, wherein the one or more optical sensors comprise: a first optical sensor positioned at a location within an intake of the cylinder to measure one or more fluid parameters within the intake; a second optical sensor positioned to measure one or more fluid parameters at a location within the cylinder; and a third optical sensor positioned at a location within an exhaust of the cylinder to measure one or more fluid parameters within the exhaust.

The engine of any preceding or following embodiment, wherein the controller is configured to calculate one or more fluid parameters within the intake comprising fuel composition or fuel energy content, one or more fluid parameters within the cylinder comprising temperature, CO, $CO_2$, $H_2O$, or UHC, and one or more fluid parameters within the exhaust comprising NOx, CO, UHC, or $CO_2$.

The engine of any preceding or following embodiment, wherein the at least one electronically-controllable actuator comprises a pair of electronically-controllable actuators configured to respectively control an intake valve and exhaust valve.

The engine of any preceding or following embodiment, wherein the engine is adaptive to a plurality of differing fuel types.

An adaptive camless reciprocating engine, the engine comprising: (a) a cylinder housing a reciprocating piston; (b) a valve coupled to the cylinder; (c) at least one electronically-controllable actuator coupled to the valve, the actuator configured to control operation of the valve; (d) one or more optical sensors disposed at or near the cylinder and configured to acquire optical data within the cylinder or at a location upstream or downstream from the cylinder; (e) a processor coupled to the one or more optical sensors and electronically-controllable actuator; and (f) a non-transitory memory storing instructions executable by the processor; (g) wherein said instructions, when executed by the processor, perform one or more steps comprising: (i) receiving data from the one or more optical sensors; (ii) calculating the one or more parameters; and (ii) sending one or more control signals to actively manage actuation of the electronically-controllable actuator according to the one or more calculated parameters.

The engine of any preceding or following embodiment, wherein said instructions, when executed by the processor, further perform one or more steps comprising: comparing the calculated parameters against a threshold; and generating one or more commands based on the comparison of the calculated parameters against the threshold; wherein data is continually received from the optical sensors to form a feedback loop between the processor, one or more optical sensors, and electronically-controllable actuator.

The engine of any preceding or following embodiment, wherein the one or more parameters are calculated using one or more techniques comprising infrared molecular spectroscopy or wavelength-modulation spectroscopy.

The engine of any preceding or following embodiment, further comprising: a plurality of electronically-controllable actuators coupled to the controller and one or more corresponding engine components, the components selected from the group consisting of an intake valve, exhaust valve, spark plug, fuel injector, and variable compression mechanism; wherein the controller is configured to manage one or more parameters selected from the group consisting of cylinder intake/exhaust valve timing, compression ratio, spark ignition, and fuel injection.

The engine of any preceding or following embodiment, wherein the one or more optical sensors are disposed at locations positioned to measure a fluid property within a cavity comprising one or more of the cylinder, an intake to the cylinder, or an exhaust of the cylinder.

The engine of any preceding or following embodiment, wherein said fluid property comprises one or more of temperature or species identification within the cavity.

The engine of any preceding or following embodiment, wherein said fluid property comprises one or more of fuel consumption, fuel energy content, exhaust gas components, cylinder combustion temperature, or cylinder combustion components within the cavity.

The engine of any preceding or following embodiment, wherein said instructions, when executed by the processor, further perform one or more steps comprising: managing one or more of timing, duration or phase parameters for actuation of the one or more components.

The engine of any preceding or following embodiment, wherein said optical sensors comprise laser absorption spectroscopy sensors.

The engine of any preceding or following embodiment, wherein said instructions, when executed by the processor, further perform one or more steps comprising: calculating parameters selected from the group consisting of engine output, fuel input, emissions, and engine load changes.

The engine of any preceding or following embodiment, wherein the one or more optical sensors comprise: a first optical sensor positioned at a location within an intake of the cylinder to measure one or more fluid parameters within the intake; a second optical sensor positioned to measure one or more fluid parameters at a location within the cylinder; and a third optical sensor positioned at a location within an exhaust of the cylinder to measures one or more fluid parameters within the exhaust.

The engine of any preceding or following embodiment, wherein said instructions, when executed by the processor, further perform one or more steps comprising: calculating one or more fluid parameters within the intake comprising fuel composition or fuel energy content, one or more fluid parameters within the cylinder comprising temperature, CO, $CO_2$, $H_2O$, or UHC, and one or more fluid parameters within the exhaust comprising NOx, CO, UHC, or $CO_2$.

The engine of any preceding or following embodiment, wherein the at least one electronically-controllable actuator comprises a pair of electronically-controllable actuators configured to respectively control an intake valve and exhaust valve.

The engine of any preceding or following embodiment, wherein the engine is adaptive to a plurality of differing fuel types.

In a camless reciprocating engine, the improvement comprising: (a) a plurality of electronically-controllable actuators configured to manage one or more parameters selected from the group consisting of cylinder intake/exhaust valve timing, compression ratio, spark ignition, and fuel injection; (b) a plurality of optical sensors, wherein a said sensor is positioned in-cylinder, a said sensor is positioned upstream of the cylinder (intake), and a said sensor is positioned down-stream of the cylinder (exhaust), and wherein said sensors measure fluid properties; and (c) a digital or analog controller circuit configured in a closed control loop wherein the controller circuit receives data from the optical sensors and processes said data to actively manage actuation of engine components selected from the group consisting of intake valves, exhaust valves, spark plugs, fuel injectors, and variable compression mechanisms.

The improved engine of any preceding or following embodiment, wherein said fluid properties are selected from the group of properties consisting of fuel consumption, fuel energy content, exhaust gas components, cylinder combustion temperature, and cylinder combustion components.

The improved engine of any proceeding or following embodiment, wherein said controller circuit manages timing, duration and phase parameters for actuation of intake valves, exhaust valves, spark, and fuel injection.

The improved engine of any proceeding or following embodiment, wherein said optical sensors are lasers.

The improved engine of any proceeding or following embodiment, wherein said controller adapts to parameters selected from the group consisting of engine output, fuel input, emissions, and engine load changes.

The improved engine of any preceding or following embodiment: (a) wherein said sensor positioned in the intake measures one or more fluid parameters selected from the group consisting of fuel composition and fuel energy content; (b) wherein said sensor positioned in-cylinder measures one or more fluid parameters selected from the group consisting of temperature, CO, $CO_2$, $H_2O$, and UHC; and (c) wherein said sensor positioned in the exhaust measures one or more fluid parameters selected from the group consisting of NOx, CO, UHC, and $CO_2$.

An any-fuel adaptive camless reciprocating engine configuration comprising the architecture shown in FIG. 1.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function"

element unless the element is expressly recited using the phrase "means for". No claim element herein is to be construed as a "step plus function" element unless the element is expressly recited using the phrase "step for".

What is claimed is:

1. An adaptive camless reciprocating engine, the engine comprising:
    a cylinder housing a reciprocating piston;
    a valve coupled to the cylinder;
    at least one electronically-controllable actuator coupled to the valve, the actuator configured to control operation of the valve;
    one or more optical sensors disposed at or near the cylinder and configured to acquire optical data within the cylinder or at a location upstream or downstream from the cylinder; and
    a controller coupled to the one or more optical sensors and the at least one electronically-controllable actuator in a closed control loop;
    wherein the controller is configured to receive data from the one or more optical sensors and process said data to actively manage actuation of the electronically-controllable actuator according to one or more parameters calculated from the acquired optical data;
    wherein the one or more optical sensors comprise:
        a first optical sensor positioned at a location within an intake of the cylinder to measure one or more fluid parameters within the intake;
        a second optical sensor positioned to measure one or more fluid parameters at a location within the cylinder; and
        a third optical sensor positioned at a location within an exhaust of the cylinder to measure one or more fluid parameters within the exhaust; and
    wherein the controller is configured to calculate one or more fluid parameters within the intake comprising fuel composition or fuel energy content, one or more fluid parameters within the cylinder comprising temperature, CO, $CO_2$, $H_2O$, or UHC, and one or more fluid parameters within the exhaust comprising NOx, CO, UHC, or $CO_2$.

2. The engine of claim 1, further comprising:
    a plurality of electronically-controllable actuators coupled to the controller and one or more corresponding engine components;
    wherein the engine components are selected from the group consisting of: an intake valve, exhaust valve, spark plug, fuel injector, and variable compression mechanism; and
    wherein the controller is configured to manage one or more parameters selected from the group consisting of cylinder intake/exhaust valve timing, compression ratio, spark ignition, and fuel injection.

3. The engine of claim 1, wherein the one or more optical sensors are disposed at locations for measurement of a fluid property within a cavity comprising one or more of the cylinder, an intake to the cylinder, or an exhaust of the cylinder.

4. The engine of claim 3, wherein said fluid property comprises one or more of temperature or species identification within the cavity.

5. The engine of claim 3, wherein said fluid property comprises one or more of fuel composition, fuel energy content, exhaust gas components, cylinder combustion temperature, or cylinder combustion components within the cavity.

6. The engine of claim 2, wherein the controller is configured to manage one or more of timing, duration or phase parameters for actuation of the one or more components.

7. The engine of claim 1, wherein said one or more optical sensors comprise laser absorption spectroscopy sensors.

8. The engine of claim 2, wherein said controller is further configured to manage parameters selected from the group consisting of engine output, fuel input, emissions, and engine load changes.

9. The engine of claim 1, wherein the at least one electronically-controllable actuator comprises a pair of electronically-controllable actuators configured to respectively control an intake valve and exhaust valve.

10. The engine of claim 1, wherein the engine is adaptive to a plurality of differing fuel types.

11. An adaptive camless reciprocating engine, the engine comprising:
    (a) a cylinder housing a reciprocating piston;
    (b) a valve coupled to the cylinder;
    (c) at least one electronically-controllable actuator coupled to the valve and configured to control operation of the valve;
    (d) one or more optical sensors disposed at or near the cylinder and configured to acquire optical data within the cylinder or at a location upstream or downstream from the cylinder;
    (e) wherein the one or more optical sensors comprise:
        a first optical sensor positioned at a location within an intake of the cylinder to measure one or more fluid parameters within the intake;
        a second optical sensor positioned to measure one or more fluid parameters at a location within the cylinder; and
        a third optical sensor positioned at a location within an exhaust of the cylinder to measures one or more fluid parameters within the exhaust;
    (f) a processor coupled to the one or more optical sensors and the at least one electronically-controllable actuator; and
    (g) a non-transitory memory storing instructions executable by the processor;
    (h) wherein said instructions, when executed by the processor, perform one or more steps comprising:
        (i) receiving fluid parameter measurement data from the one or more optical sensors;
        (ii) calculating one or more fluid parameters within the intake comprising fuel composition or fuel energy content, one or more fluid parameters within the cylinder comprising temperature, CO, $CO_2$, $H_2O$, or UHC, and one or more fluid parameters within the exhaust comprising NOx, CO, UHC, or $CO_2$; and
        (iii) sending one or more control signals to actively manage actuation of the at least one electronically-controllable actuator according to the one or more calculated fluid parameters.

12. The engine of claim 11, wherein said instructions, when executed by the processor, further perform one or more steps comprising:
    comparing the calculated parameters against a threshold; and
    generating one or more commands based on the comparison of the calculated parameters against the threshold;
    wherein data is continually received from the optical sensors to form a feedback loop between the processor, one or more optical sensors, and electronically-controllable actuator.

13. The engine of claim 12, wherein the one or more parameters are calculated using one or more techniques comprising infrared molecular spectroscopy or wavelength-modulation spectroscopy.

14. The engine of claim 11, further comprising:
   a plurality of electronically-controllable actuators coupled to a controller and one or more corresponding engine components, the components selected from the group consisting of an intake valve, exhaust valve, spark plug, fuel injector, and variable compression mechanism;
   wherein the controller is configured to manage one or more parameters selected from the group consisting of cylinder intake/exhaust valve timing, compression ratio, spark ignition, and fuel injection.

15. The engine of claim 11, wherein the one or more optical sensors are disposed at locations positioned to measure a fluid property within a cavity comprising one or more of the cylinder, an intake to the cylinder, or an exhaust of the cylinder.

16. The engine of claim 15, wherein said fluid property comprises one or more of temperature or species identification within the cavity.

17. The engine of claim 15, wherein said fluid property comprises one or more of fuel composition, fuel energy content, exhaust gas components, cylinder combustion temperature, or cylinder combustion components within the cavity.

18. The engine of claim 14, wherein said instructions, when executed by the processor, further perform one or more steps comprising:
   managing one or more of timing, duration or phase parameters for actuation of the one or more components.

19. The engine of claim 11, wherein said one or more optical sensors comprise laser absorption spectroscopy sensors.

20. The engine of claim 11, wherein said instructions, when executed by the processor, further perform one or more steps comprising:
   calculating parameters selected from the group consisting of engine output, fuel input, emissions, and engine load changes.

21. The engine of claim 11, wherein the at least one electronically-controllable actuator comprises a pair of electronically-controllable actuators configured to respectively control an intake valve and exhaust valve.

22. The engine of claim 11, wherein the engine is adaptive to a plurality of differing fuel types.

23. In a camless reciprocating engine, the improvement comprising:
   (a) a plurality of electronically-controllable actuators configured to manage one or more parameters selected from the group consisting of cylinder intake/exhaust valve timing, compression ratio, spark ignition, and fuel injection;
   (b) a plurality of optical sensors, wherein one sensor of the plurality of optical sensors is positioned in-cylinder, one sensor of the plurality of optical sensors is positioned upstream of the cylinder as an intake sensor, and one sensor of the plurality of optical sensors is positioned down-stream of the cylinder as an exhaust sensor, and wherein said plurality of optical sensors measure fluid properties; and
   (c) a digital or analog controller circuit configured in a closed control loop wherein the controller circuit receives data from the optical sensors and processes said data to actively manage actuation of engine components selected from the group consisting of intake valves, exhaust valves, spark plugs, fuel injectors, and variable compression mechanisms;
   (d) wherein said sensor positioned in the intake measures one or more fluid parameters selected from the group consisting of fuel composition and fuel energy content;
   (e) wherein said sensor positioned in-cylinder measures one or more fluid parameters selected from the group consisting of temperature, CO, $CO_2$, $H_2O$, and UHC; and
   (f) wherein said sensor positioned in the exhaust measures one or more fluid parameters selected from the group consisting of NOx, CO, UHC, and $CO_2$.

24. The improved engine of claim 23, wherein said fluid properties are selected from the group of properties consisting of fuel composition, fuel energy content, exhaust gas components, cylinder combustion temperature, and cylinder combustion components.

25. The improved engine of claim 23, wherein said controller circuit manages timing, duration and phase parameters for actuation of intake valves, exhaust valves, spark, and fuel injection.

26. The improved engine of claim 23, wherein said plurality of optical sensors are lasers.

27. The improved engine of claim 23, wherein said controller adapts to parameters selected from the group consisting of engine output, fuel input, emissions, and engine load changes.

* * * * *